INVENTOR.
Elmer E. Reese
BY
Donald P. Selucki
ATTORNEY

INVENTOR.
Elmer E. Reese
BY
Donald P. Selucki
ATTORNEY

United States Patent Office 3,421,174
Patented Jan. 14, 1969

3,421,174
WINDSHIELD WIPER SYSTEM RECESSED IN AUTOMOBILE AIR INTAKE
Elmer E. Reese, Dayton, Ohio, assignor to General Motors Corporation, Detroit, Mich., a corporation of Delaware
Filed Jan. 3, 1967, Ser. No. 606,912
U.S. Cl. 15—250.19   3 Claims
Int. Cl. B60s 1/02; A47l 1/00

ABSTRACT OF THE DISCLOSURE

In a preferred form, this disclosure relates to a vehicle windshield wiping and/or washing system physically located in the entry to the plenum of the vehicle heater and air conditioning system. The windshield wiper arms and blades are therefore disposed in an elongated slot running the full width of the windshield while the windshield wiper system is not operating, with the arms and blades rising from the slot to complete a wipe pattern across the windshield while operating.

---

This invention relates to windshield wiper and washer systems and more particularly to a windshield wiper assembly concealed in a slot in front of the windshield which also serves as an air intake for the vehicle ventilating systems.

Windshield wiper arms and blades are conventionally located on a cowl panel located just below and forward of a vehicle windshield. Normally, the pivot points for the arms and blades are driven by a power source located beneath the vehicle external covering but the wiper arms and blades are on the exterior of the vehicle visible from both inside and outside the vehicle. The wiper blades are normally positioned near the lower part of the windshitld either wholly or partially on the glass surface. Certain design windshield wipers are rather unsightly and disturb the overall aesthetic appearance of the vehicle by protruding from the external covering thereof.

It is an object of the present invention to provide wiper mechanism for use on vehicles which is substantially concealed from view from both inside and outside the vehicle.

It is another object of the present invention to provide an improved windshield wiper system which adds to the external aesthetic appearance of a vehicle by not protruding from the external covering thereof.

It is still another object of the present invention to carry out the aforementioned objects of the present invention in an efficient and economical manner by utilizing a portion of the air intake means of a vehicle for a mounting position for the windshield wiping system.

It is a further object of the present invention to provide an improved windshield wiping mechanism which is physically positioned in a slot running substantially the horizontal length of the windshield which also serves as an air intake duct for the vehicle ventilating system in which the wiper blades are positioned at rest below a line defined by the vehicle external covering.

It is still a further object of the present invention to provide an improved windshield wiper mounting arrangement utilizing a space formed by the rear edge of the hood assembly and the vehicle windshield and cowl when the hood is in a latched position.

Further objects and advantages of the present invention will be apparent from the following description, reference being had to the accompanying drawings wherein preferred embodiments of the present invention are clearly shown.

Figure 1:
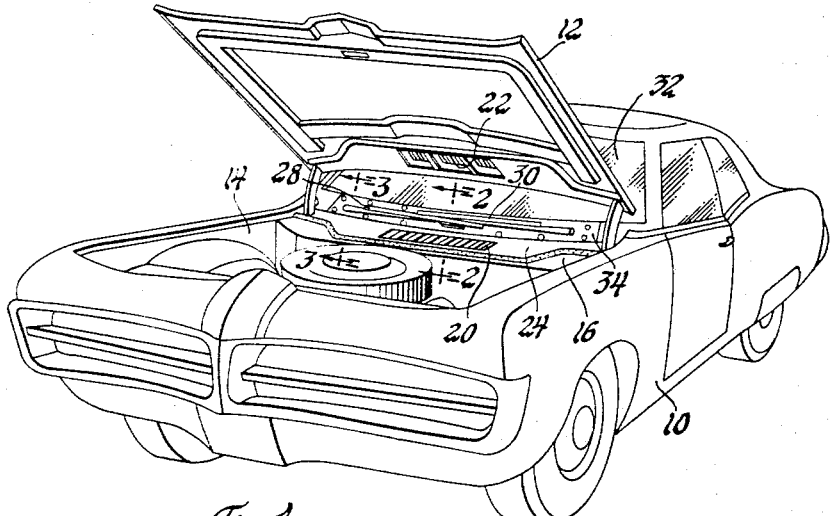
Figure 2:
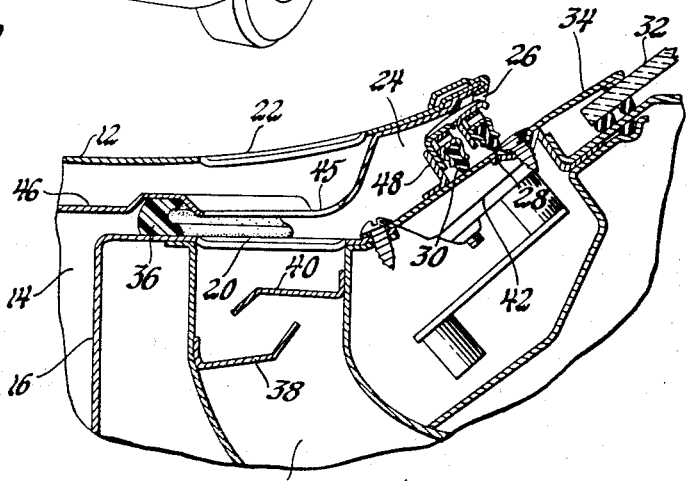
Figure 3:
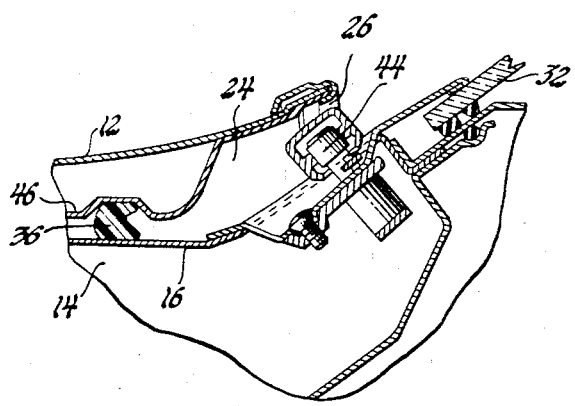
Figure 4:
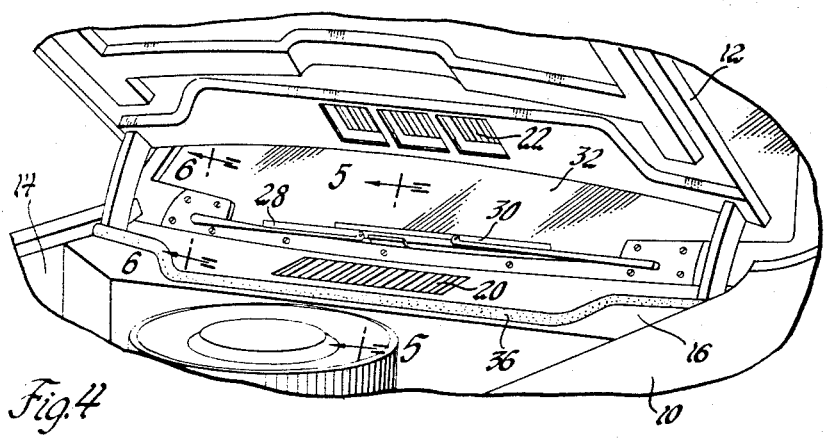
Figure 5:
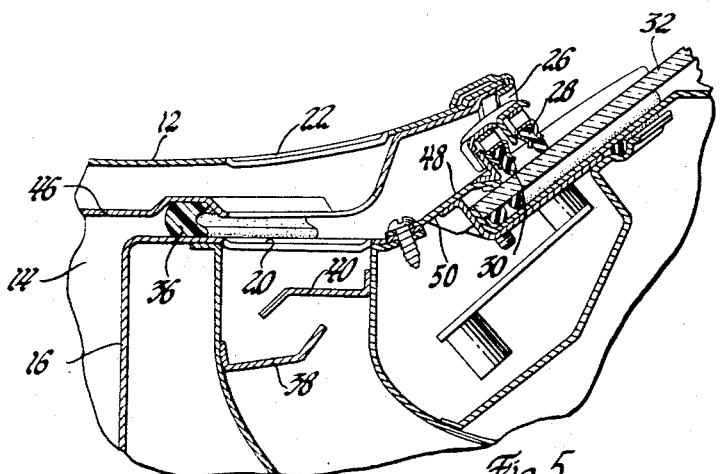
Figure 6:
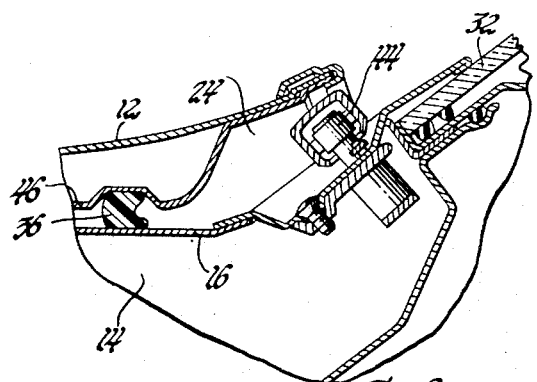

In the drawings:
FIGURE 1 is a perspective view of a vehicle with the hood in an upraised position exposing the parking area for the windshield wiper system;
FIGURE 2 is a sectional view taken along line 2—2 of FIGURE 1;
FIGURE 3 is a sectional view taken along line 3—3 of FIGURE 1;
FIGURE 4 is an enlarged partial perspective view similar to FIGURE 1 wherein the wiper blades are shown parked on a portion of the windshield extending down into the air intake for the vehicle ventilating system plenum chamber;
FIGURE 5 is a sectional view taken along line 5—5 of FIGURE 4;
FIGURE 6 is a sectional view taken along line 6—6 of FIGURE 4.

Referring to FIGURE 1, a vehicle 10 is shown with an open hood 12 which forms a cover for engine compartment 14. Directly behind engine compartment 14 is a cowl 16 which houses an air plenum chamber, best seen in FIGURE 2, which is the intake for the vehicle ventilating system. A grille 20 in cowl 16 prevents extraneous material having some substantial mass from entering air plenum 18. Auxiliary grille 22 is formed in hood 12 and provides a path for air flow into chamber 24 which is formed when hood 12 is in a closed position, best seen in FIGURE 2.

Referring to FIGURE 2, hood 12 is shown in the closed position wherein chamber 24 has a slot opening 26 running substantially the width of the windshield and which serves as the main path for air intake into chamber 24 as well as providing a clearance for the passage of wiper blades 28 and 30 from their parked position, as seen in FIGURE 2, onto windshield 32 across ramp 34. Ramp 34 substantially follows the contour of the windshield in contiguous relationship therewith and provides an inclined plane from windshield 32 and a parking position for blades 28 and 30 at the beginning and at the end of an operating cycle.

Referring to FIGURE 2, engine compartment 14 is isolated from chamber 24 by resilient seal 36 carried by cowl 16. In this manner, dirt and obnoxious odors present or generated in engine compartment 14 are kept from air plenum 18 which, as previously stated, communicates with the vehicle ventilating system. Moisture entering slot opening 26 and chamber 24 is free to enter air plenum 18 and is directed toward drains, not shown, in the air plenum by baffles 38 and 40. Windshield wiper drive mechanism 42 is mounted on the underside of cowl 16 and drives blades 28 and 30 by means of pivot 44 extending through cowl 16 in a conventional manner. This arrangement is best seen in FIGURE 3.

In operation, the windshield wipers are normally parked in the position shown in FIGURE 1 but with hood 12 in a closed configuration similar to that illustrated in FIGURE 2. With hood 12 in a closed position, chamber 24 is formed by a support portion of hood 12 engaging seal 36 carried by cowl 16. Air can enter air plenum 18 either through slot opening 26 which is only partially obstructed by blades 28 and 30 as well as through auxiliary grille 22 and opening 45 in hood support member 46. It is well known that the area near the lower part of the vehicle windshield adjacent the hood and cowl area is a high pressure area when a vehicle is moving, thereby facilitating the entry of air through the openings previously mentioned. With the vehicle stationary, the blower fans normally associated with a vehicle ventilating system serve to draw air through the openings previously mentioned in sufficient quantities to operate the ventilating system.

Blades 28 and 30 are shown in FIGURE 2 in a parked position bearing against stop 48 which is either attached to ramp 34 as shown in FIGURE 2 or integrally formed therewith as desired. Stop 48 is designedly positioned at a point in chamber 24 allowing maximum ingress of air and at a point where the windshield wiper arms and blades are below slot opening 26. Therefore, when the blades 28 and 30 are positioned in a parked position, as shown in FIGURE 2, they are substantially concealed from a point outside the vehicle except from a vantage point falling on a plane substantially parallel to the inclined plane of the windshield. When the windshield wiper mechanism is put into operation, blades 28 and 30 are driven across ramp 34 in a conventional manner onto windshield 32 and thereafter wipe a desired pattern on the glass without again engaging the surface of ramp 34.

When the windshield wipers are shut off, the operation is substantially the same as in a windshield wiper system described in Patent No. 2,985,024, assigned to the same assignee as the present invention, wherein a park cycle is initiated when the wipers are deenergized and then blades 28 and 30 cross onto ramp 34 and reengage stop 48. The end of the park cycle is designed to place the blades 28 and 30 substantially against stop 48 which is the parked position.

Another embodiment of the subject invention is illustrated in FIGURE 4 with the basic difference from the embodiment shown in FIGURE 1 being the extension of windshield 32 down into slot opening 26 so that wiper blades 28 and 30 park on the glass of windshield 32. The remainder of the construction is substantially the same as in the embodiment of FIGURE 1 with the exception just noted. In the embodiment of FIGURE 4, as best seen in FIGURE 5, stop 48 is formed integrally with or attached to a windshield lower reveal molding 50. The basic advantage afforded by the second embodiment is the elimination of a precisely designed ramp 34 substituted for by a lower reveal molding having considerably less need for dimensional accuracy. Another advantage of the embodiment of FIGURE 4 is the ability to utilize a windshield wiper drive mechanism which does not include the parking cycling mechanism. This arrangement, of course, has distinct cost advantages over a windshield wiper mechanism having a parking cycle.

The subject invention finds its basic utility in the fact that a cowl panel having louvers therein for air intake commonly used on motor vehicles can be eliminated by merely extending the hood rearwardly into the area normally covered by the cowl panel. In addition, the windshield wipers are substantially concealed lending to the aesthetic properties of the vehicle and are positioned in an area that doubles as an air intake for the vehicle ventilating system. Certain body panels are thereby eliminated with their attendant cost and the windshield wiper mechanism is just as effective as the conventional installation where they are exposed externally of the vehicle outer covering. Water and snow are allowed to drop into the air plenum where they are carried away in much the same manner as done in conventional air intakes and any impacted or frozen material found in the slot or chamber 24 is easily removed by raising hood 12 to expose the parking area for the windshield wipers. Similarly the wiper blades and arms can be serviced and/or replaced since they are readily accessible when the hood is raised.

While the embodiments of the present invention, as herein disclosed, constitute preferred forms, it is to be understood that other forms might be adopted.

I claim:

1. An automobile including, in combination: body structure having a front engine compartment and a driving compartment with a windshield forward therein, said engine compartment being defined at its rearmost portion by a cowl panel extending to a point near the base of said windshield; movable hood structure providing a cover for said engine compartment and extending rearwardly from the front of said automobile to a point spaced from said windshield a set distance substantially following the contour thereof; seal means overlaying said cowl panel and being compressed between said cowl panel and said hood structure when said hood structure is in a closed disposition to form an elongated compartment rearwardly of the engine below the trailing edge of said hood structure forwardly of said windshield; windshield wiper mechanism including arms and blades for cleaning a predetermined area on said windshield, said mechanism mounted in said elongated compartment with said arms and blades having a parked position therein from which position a wiping period is initiated and ended; and an air plenum chamber for the entry of ventilating air into said driving compartment utilizing said elongated compartment as an entry for air from the atmosphere into said air plenum chamber.

2. An automobile including, in combination: a body structure having a windshield and defining a passenger compartment and a front engine compartment, said last compartment being defined at its upper rear portion by a relatively flat first panel contiguous with the windshield and defining in connection with the windshield a ramp extending from a point near the lower margin of the windshield downwardly and forwardly of the automobile substantially along the plane of the windshield; a windshield wiper drive structure having a plurality of spaced reciprocable wiper pivots positioned normal to the plane of the windshield within the margins of said relatively flat panel; windshield wiper arm and blade assemblies carried by said pivots and operable therewith to wipe a predetermined area on the windshield and upon extension of such wiping movement to ride over said panel; an engine hood panel in normal position forming a covering for the engine compartment and in elevated position exposing at least a portion of said engine compartment viewed from above the automobile, said hood in normal position in part overlaying said first panel to define the top and bottom walls of a chamber; a compressible seal sandwiched between said first panel and hood forwardly of the wiper pivots to define the front wall of said chamber, said seal extending in generally parallel relation to the lower margin of the windshield, the rear of said chamber being open to provide free entrance and exit of the windshield wiper arm and blade assemblies into and out of parked position, said wiper arm and blade assemblies being driven by said windshield wiper drive structure from said chamber across said ramp onto the windshield to reciprocate between extremes of movement on the windshield to wipe a predetermined portion of said windshield, said wiper arm and blade assemblies being movable onto the ramp and into said chamber at the end of an operative period to said parked position; said first panel being apertured forwardly of said wiper pivots and rearwardly of the seal; and means defining an air passage through the aperture into the passenger compartment, said hood further having an aperture generally coextensive with the first mentioned aperture to form an air flow path into the passenger compartment unobstructed by the wiper blades.

3. An automobile including, in combination: body structure having a front engine compartment and a drive compartment with a windshield formed forwardly of and defining the front thereof, said engine compartment being defined at its rearmost portion by a cowl panel extending to a point near the base of said windshield; pivotable hood structure providing a cover for said engine compartment and extending rearwardly from the front of said automobile to a point spaced from said windshield a predetermined distance therefrom substantially following the contour thereof; seal means overlaying a portion of said cowl panel and being compressed between said cowl panel and said hood structure when said hood structure is in a closed disposition to form an elongated compartment rearwardly of the engine below the trailing edge of said hood structure forwardly of said windshield, said seal means providing a fluid dam between said engine compartment and said elongated compartment; windshield wiper mechanism including wiper pivots and arms and blades carried thereby for cleaning a predetermined area on said windshield, said windshield having a portion extending into said elongated compartment below a point defined by a line connecting said wiper pivots serving as a parking position in said elongated compartment for said arms and blades, said arms and blades movable from said parked position out of said elongated compartment to the predetermined area to be wiped and traversing said area to be wiped on said windshield without withdrawing into said elongated compartment until the end of a wiping period; and an air plenum chamber situated within the confines of said cowl panel adapted to direct air from the exterior of the automobile into a ventilating system therefor, said air plenum chamber utilizing said elongated compartment as an entry duct from the atmosphere.

References Cited

UNITED STATES PATENTS

| | | | |
|---|---|---|---|
| 2,206,822 | 7/1940 | Rousseau | 15—250.16 |
| 2,936,477 | 5/1960 | Feller | 15—250.19 |
| 3,016,558 | 1/1962 | Deibel | 15—250.16 |
| 3,120,673 | 2/1964 | Buchwald | 15—250.17 |
| 3,213,478 | 10/1965 | Pollock | 15—250.16 |

FOREIGN PATENTS 1,138,106   1/1957   France.

WALTER A. SCHEEL, *Primary Examiner.*

ROBERT I. SMITH, *Assistant Examiner.*

269—37